United States Patent
Nielsen et al.

(10) Patent No.: US 8,945,782 B2
(45) Date of Patent: Feb. 3, 2015

(54) METHOD OF PRODUCING A MULTILAYER BARRIER STRUCTURE FOR A SOLID OXIDE FUEL CELL

(75) Inventors: Karsten Agersted Nielsen, Roskilde (DK); Søren Linderoth, Roskilde (DK); Peter Vang Hendriksen, Hilleroed (DK); Åsa Persson, Taastrup (DK); Lars Mikkelsen, Roskilde (DK); Niels Christiansen, Gentofte (DK); Jørgen Gutzon Larsen, Bagsværd (DK)

(73) Assignees: Technical University of Denmark, Kgs. Lyngby (DK); Topsoe Fuel Cell A/S, Kgs. Lyngby (DK)

(*) Notice: Subject to any disclaimer, the term of this patent is extended or adjusted under 35 U.S.C. 154(b) by 1195 days.

(21) Appl. No.: 12/522,415

(22) PCT Filed: Nov. 13, 2007

(86) PCT No.: PCT/EP2007/009805
§ 371 (c)(1), (2), (4) Date: Jan. 15, 2010

(87) PCT Pub. No.: WO2008/083788
PCT Pub. Date: Jul. 17, 2008

(65) Prior Publication Data
US 2010/0119886 A1 May 13, 2010

(30) Foreign Application Priority Data
Jan. 9, 2007 (EP) .................................. 07000359

(51) Int. Cl.
*H01M 8/00* (2006.01)
*H01M 8/10* (2006.01)
*H01M 8/02* (2006.01)
*H01M 8/24* (2006.01)
*H01M 8/04* (2006.01)

(52) U.S. Cl.
CPC .......... *H01M 8/0228* (2013.01); *H01M 8/0217* (2013.01); *H01M 8/0219* (2013.01); *H01M 8/2425* (2013.01); *H01M 8/021* (2013.01); *H01M 8/04268* (2013.01); *Y02E 60/50* (2013.01)
USPC ............................ 429/400; 429/479; 427/115

(58) Field of Classification Search
USPC .................................. 429/400, 479; 427/115
See application file for complete search history.

(56) References Cited

U.S. PATENT DOCUMENTS

| | | | |
|---|---|---|---|
| 5,942,349 A * | 8/1999 | Badwal et al. | ................. 429/495 |
| 2005/0214613 A1 | 9/2005 | Sarkar et al. | ................... 429/31 |
| 2006/0099442 A1 * | 5/2006 | Tietz et al. | .................... 428/640 |

FOREIGN PATENT DOCUMENTS

| | | |
|---|---|---|
| DE | 44 22 624 A1 | 1/1996 |
| DE | 196 27 504 C1 | 10/1997 |

(Continued)

*Primary Examiner* — Karie O'Niell Apicella
(74) *Attorney, Agent, or Firm* — Seed IP Law Group PLLC

(57) ABSTRACT

The present invention provides a method of producing a multilayer barrier structure in a solid oxide cell stack, comprising the steps of: —providing a metal interconnect; —applying a first metal oxide layer on said metal interconnect; —applying a second metal oxide layer on top of said first metal oxide layer; —applying a third metal oxide layer on top of said second metal oxide layer; —forming a solid oxide cell stack comprising said metal interconnect having said metal oxide layers thereon; and —reacting the metal oxide in said first metal oxide layer with the metal of said metal interconnect during the SOC-stack initialization, and a solid oxide stack comprising an anode contact layer and support structure, an anode layer, an electrolyte layer, a cathode layer, a cathode contact layer, a metallic interconnect, and a multilayer barrier structure which is obtainable by the above method and through an initialization step, which is carried out under controlled conditions for atmosphere composition and current load, which depends on the layer composition facilitating the formation of the desired reaction products as a dense barrier layer without chromium species migrating to the air-electrode.

17 Claims, 2 Drawing Sheets

(56) References Cited

FOREIGN PATENT DOCUMENTS

| DE | 19627504 C1 * | 10/1997 | ............... C23C 4/02 |
| DE | 199 32 194 A1 | 1/2001 | |
| DE | 100 50 010 A1 | 4/2002 | |
| DE | 103 06 649 A1 | 9/2004 | |
| WO | WO 03/007403 A1 | 1/2003 | |
| WO | WO 2005/122300 A2 | 12/2005 | |
| WO | WO 2006/059943 A1 | 6/2006 | |

* cited by examiner

METHOD OF PRODUCING A MULTILAYER BARRIER STRUCTURE FOR A SOLID OXIDE FUEL CELL

TECHNICAL FIELD

The present invention relates to a method of producing a multilayer barrier structure in a solid oxide cell stack, such as a solid oxide fuel cell (SOFC) stack or a solid oxide electrolysis cell (SOEC) stack, and to a multilayer structure obtainable by said process, which is especially suitable for use on the oxygen side of the interconnect component separating adjacent cells of said stacks.

BACKGROUND ART

Solid oxide cells (SOC's) generally include cells designed for different applications, such as solid oxide fuel cells (SOFC's), or solid oxide electrolysis cells (SOEC's). These types of cells are well known in the art. Typically, a solid oxide fuel cell comprises an electrolyte layer sandwiched by two electrode layers. During operation, usually at a temperature from about 500° C. to about 1100° C., one electrode is in contact with oxygen or air and the other electrode is in contact with a fuel gas.

Under typical operating conditions, a single solid oxide fuel cell produces less than 1 volt. To obtain high voltage and power from the SOFC's, it is therefore necessary to stack many cells together. Since the manufacturing methods for SOFC planar stacks comprise the manufacture of single cells, the obtained cells are subsequently stacked together with additional layers such as interconnects, current collectors, contact layers and seals to form a fuel cell stack suitable for the desired application.

One of the problems limiting the fuel cell mass production at an industrial level up to date is the high cost of the final cells. Therefore, for fuel cells and electrolysis cells operating in a medium temperature range (about 500° C. to 900° C.), it has been suggested to employ relatively cheap metal interconnect components separating the individual cells.

Suitable materials for said metal interconnect layers need to be oxidation resistant against anode and cathode gases under elevated operation temperatures, and must further exhibit a thermal expansion coefficient (TEC) that matches the TEC of the ceramic components of the cell. In view of these requirements, particularly chromia-forming alloys have been investigated as support materials during the manufacturing process, which will form the later interconnect layer. Said alloys comprise a high chromium content, i.e. about 15 to 22% by weight, which, under oxidative conditions, migrates towards the surface and forms a chromia barrier layer or chromia scale on the surface which protects the component against further oxidation. At the same time, said chromia scale exhibits a sufficiently high electrical conductivity in order not to impede the overall performance of the device.

However, during operation of the cell, chromium ions may diffuse from the chromium containing metal interconnect materials into the adjacent air electrode layers and disadvantageously affect the catalyst performance and thus limit the cell performance over time. This phenomenon is generally known as 'chromium poisoning'. The chromium poisoning is due to the chromium in the metal interconnect being transported from the metal via gaseous chromium containing oxides and oxy-hydroxides and by surface diffusion on the bridging metal oxide components to the electrochemically active sites near to or on the air-side of the electrode, where they quickly deteriorate the electrochemical activity to a considerable degree.

In order to attain a low electrical resistance and to reduce chromium poisoning from the chromia scale forming alloys employed as the interconnect material, it has been suggested to apply a manganese chromium spinel on top of a layer of chromia. US-A1-2003/0059335 for example proposes a chromium oxide forming iron-based alloy, comprising 12 to 28 wt % chromium and small amounts of La, Mn, Ti, Si, and Al. The material is capable of forming at its surface a $MnCr_2O_4$ spinel phase at temperatures of 700° C. to 950° C. The so formed manganese chromium spinel was expected to have a slightly lower vaporization pressure for chromium containing species than chromia itself.

However, it was found that disadvantageously the Cr-diffusion in fact proceeds faster in the $MnCr_2O_4$ spinel than in the chromia layer. Thus, the formation of a duplex $Cr_2O_3$—$(Mn,Cr)_3O_4$ scale does not provide any significant increase in protection from chromium poisoning, as compared to a pure chromia scale.

Different coatings that prevent chromium containing vapours from developing on the employed iron-chrome-alloy used as the interconnect in cells have been discussed in both, patent and scientific journal literature, for example in Tietz, F. et al. (2004) DE 103 06 649 A1, Tietz, & Zahid (2004) DE 103 06 647 A1, Hilliard D. B. (2003) US2003194592-A1, Orlovskaya N et al. (2004). J. Am. Cer, Soc 87, pp. 1981-7, Chen, X. et al. (2004) Solid State Ionics 176, pp. 425-33. The common coating concept encompasses the formation of a spinel or perovskite layer with it's final microstructure on top of the metallic interconnect prior to the insertion in an SOFC stack, where said coating acts as a barrier layer to chromium migration from the metal interconnect into the air electrode compartment. In order for these coatings to be sufficiently tight, the adhesion between coating and substrate has to be perfect initially as well as in the longer terms, i.e. after thermal cycling, which puts severe limitations to both the processing and the match between thermal expansion coefficients of the layers and the steel.

In view of these problems, reactive coatings offer a better solution as they are transformed into a barrier layer grown at high temperature and typically exhibit a more gradual change in microstructure between the metallic substrate and the overlying oxide coating. Reactive coatings as such have been discussed in, for example, the reports on screening spinel and perovskite coatings: Fujiata, K. el al. (2004) J. Power Sources 131, pp. 261-9; and Larring & Norby (2000), J. of the Electrochem. Soc. 147, pp. 3251-6. The disclosed coatings are single-phase or single-substance coatings, and are applied in order to form an electrically conductive corrosion protective coating on the metallic surface. Said coatings contain as little chromium as possible in order to reduce the transport of chromium from the metal surface for as long as possible, and to reduce the transport of oxygen from the atmosphere into the metal.

Protective coatings functioning as chromium getters are disclosed, for example, in Jiang S. P et al. (2002) J. Eur Cer. Soc. 22, pp. 361-73; and Matsuzaki & Yasuda (2001) J of the Electrochem. Soc. 148, pp. A126-31. It is discussed how chromium-containing phases are precipitated on various air electrode materials and on different electrolyte materials. The interest particularly focuses on the chromium precipitated on air electrode materials including LSM and LSCF without cathodic polarization.

Disclosed is further that chromium readily bonds with elements, such as Mn, from the perovskite structure of the LSM cathode, and creates well-crystalline spinel phases which may be retrieved at the border surface between the electrolyte and air electrode material if the LSM air electrode is exposed to an electrochemical polarization. LSCF air electrodes are not as dependent upon the electrochemical potential of the electrode, but the chromium-containing phases nevertheless generally precipitate in the pore volume of the electrode.

In summary, the barrier layers suggested in the prior art so far function to suppress the formation of chromium containing vapours during operation of the cell from the beginning, but also require an additional and often costly processing of the metallic interconnects prior to their use in a SOFC stack, hence preventing mass production of the stacks. Furthermore, the applied surface coatings must be both, chemically and thermomechanically compatible with the metal interconnect materials in a wide range of temperatures, i.e. operating temperatures of the cell of about 500-900° C., which severely limits the use of otherwise suitable materials. Finally, while the initial chromium diffusion or evaporation may be reduced to certain extent, most layers cannot prevent chromium diffusion over the lifetime of the cell and thus cannot prevent chromium poisoning of the electrode layers over time.

Therefore, there still exists a need for a cost effective method for eliminating the evaporation of chromium from the interconnect surface in solid oxide cells, which makes it possible to accommodate chromium vapor species and which minimizes the electrical contact resistance between the interconnect and the air electrode layer.

In view of the above, the present invention advantageously provides reactive coatings, applied through a cheap method, such as spraying a particle suspension on the interconnect surface and/or the air side of the solid oxide cells prior to assembling of the cell stack, the coating minimizing the chromium evaporation from the metallic surface once a dense, preferably chromium-free reaction layer has been formed in a sufficient layer thickness. At the same time, an overlaying coating traps chromium-containing species diffusing from the metallic surface during the initial period before they can reach the active locations of the air electrode layer.

The multi-functional coatings of the present invention reduce the problem of chromium poisoning to a technologically insignificant level, at the same time avoiding the much more expensive application methods for applying coatings with a similar scope suggested in the prior art to date, and provide a cost effective multilayer barrier structure extending the life time of a SOC.

SUMMARY OF THE INVENTION

In view of the disadvantages of the prior art as described above, the present invention provides a method of producing a multilayer barrier structure in a solid oxide cell stack, comprising the steps of:
providing a metal interconnect;
applying a first metal oxide layer on said metal interconnect;
applying a second metal oxide layer on top of said first metal oxide layer;
applying a third metal oxide layer on top of the said second metal oxide layer;
forming a solid oxide cell stack comprising said metal interconnect having said metal oxide layers thereon; and
reacting the metal oxide in said first metal oxide layer with the metal of said metal interconnect during the SOC-stack initialisation.

The present invention further provides a multilayer barrier structure, obtainable by the above method.

The present invention also provides a solid oxide cell stack comprising an anode contact layer and support structure, an anode layer, an electrolyte layer, a cathode layer, a cathode contact layer, a metallic interconnect, and the above multilayer barrier structure.

The present invention moreover provides a method for controlling the heating sequence and the gas phase composition, preferably the oxygen partial pressure, during the initialisation of the said solid oxide cell stack so as to transform the barrier layer into an electrically conductive and dense reaction product.

The present invention finally provides a method for reducing the affinity between the air electrode and chromium during the initialisation sequence of the above stack, comprising the step of applying a constant or an alternating electrical potential between the air electrode and the interconnect.

Preferred embodiments are set forth in the subclaims.

DETAILED DESCRIPTION OF THE INVENTION

Figure 1:
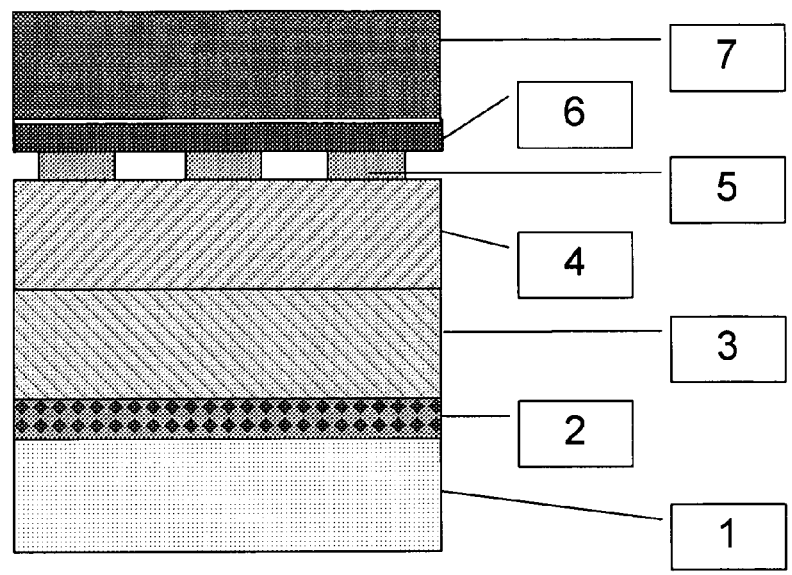
FIG. 1 illustrates a preferred embodiment of the multilayer structure of the present invention.

The present invention provides a method of producing a multilayer barrier structure in a solid oxide cell stack, comprising the steps of:
providing a metal interconnect;
applying a first metal oxide layer on said metal interconnect;
applying a second metal oxide layer on top of said first metal oxide layer;
applying a third metal oxide layer on top of said second metal oxide layer;
forming a solid oxide cell stack comprising said metal interconnect having said metal oxide layers thereon; and
reacting the metal oxide in said first metal oxide layer with the metal of said metal interconnect during the SOC-stack initialisation.

With the method of the present invention, a multilayer barrier structure is applied between the metallic interconnect and the air electrode layer in a SOC stack. When the stack is initiated, the formation of a thermally grown barrier is facilitated, which in turn minimises the evaporation of chromium from the interconnect surface, accommodates chromium vapour species and at the same time minimises the electrical contact resistance between the two components, the interconnect and the air electrode.

Preferably, the metal interconnect is a ferritic stainless steel layer. Ferritic steels are comparatively cheap and allow a cost effective large-scale production of the stack. According to the invention, the metal interconnect comprises chromium, such as a chromium layer or chromium alloy, and may preferably comprise a FeCrMx alloy, wherein Mx is selected from the group consisting of Ni, Ti, Ce, Mn, Mo, W, Co, La, Y, Al, Nb, or mixtures thereof. The concentrations of Mx in the alloy are preferably in amounts such that austenite formation is avoided. Preferably, the concentration of Mx is in the range of 0 to 15% by weight, and more preferably from about 0.1 to 10% by weight, based on the total weight of the alloy. Most preferred is a concentration of Mn of from 0.25% to 0.55% by weight.

Ferritic steels, exemplified by commercial products such as Crofer 22APU (from Krupp-Thyssen) develop either a well-defined duplex scale of chromia and a Cr—Mn-spinel, or a mixed chromia-spinel scale with a less evident phase separation, for example in case of 0YC44 (obtainable from Sandvik) and Hitachi ZMG232 (obtainable from Hitachi).

Preferably, the first metal oxide layer applied on the metal interconnect comprises a mixture of metal oxides having at least two different metal cations, or a mixture of metal oxides having at least two different metal cations and a transition metal oxide. More preferred is the metal oxide mixture comprising lanthanum oxide and a transition metal oxide, more preferably cobalt oxide, manganese oxide, or copper oxide, and mixtures thereof. Most preferred as one of the metal oxides is cobalt oxide.

Said metal oxide having at least two different metal cations has preferably a perovskite structure. Suitable perovskite materials include doped lanthanum manganite, doped lanthanum cobaltite, doped lanthanum ferrite, and mixtures thereof.

The first metal oxide layer may be applied by any suitable method known to the skilled person. Preferred is spray painting of the layer or laminating with a tape cast film.

The first metal oxide layer in the final multilayer barrier structure reacts at least partially with oxygen and the outward diffusing metal elements form the interconnect during the initialization step, thereby forming a seamless transition between the second layer and the formed protective chromium scale that grows on the metal surface when subjected to oxidising conditions at high temperature. As illustrated in FIG. 1, the first metal oxide layer 2 forms a dense mixed oxide layer having a chromia content as low as possible, such as a $MnCo_2O_4$ layer, wherein the Mn from the metallic interconnect 1 reacts with the applied cobalt oxide. Said layer thus forms an efficient barrier layer that effectively minimises the transport of chromium from the metal through the scale.

FIG. 1 is a schematic illustration of a preferred embodiment of the multilayer structure encompassing the metallic interconnect 1, a first layer of metal oxide 2, a second layer of mixed metal oxides of which one has a perovskite structure 3, a third layer of mixed metal oxides having perovskite structures 4, and additionally spacers for air admittance 5 to the air electrode 6, which is deposited on the electrolyte and, optionally, the solid oxide cell support 7.

The thickness of said first metal oxide layer preferably is in a range of from about 1 to about 20 μm, more preferably of from about 3 to about 15 μm.

Figure 2A:
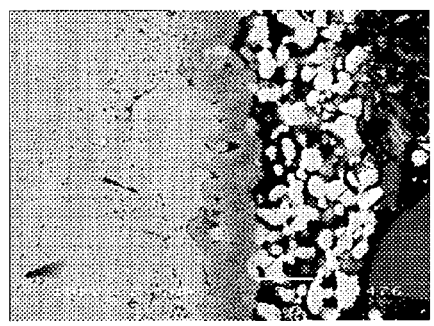
FIGS. 2a and 2b are micrographs showing a cross section of a barrier structure in accordance with the present invention as a function of layer thickness.
Figure 2B:
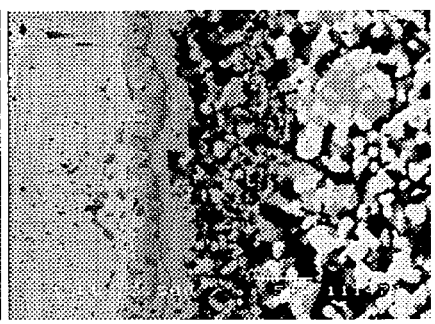

In order to develop a microstructure with a minimum electrical resistance, i.e. where the dense, chromia-lean first layer has good contact to the second layer, the amount of material in the first layer has to be minimised. On the other hand, in order to develop a layer with a low chromium content, sufficient amounts of metal oxide have to be available, as is summarized in Table 1. It was found that the chromium content drops by a factor of two, i.e. from 0.7 to 0.3, when the layer thickness of the first layer is increased from 7 μm to 15 μm. This is also illustrated by FIGS. 2a and 2b, showing the microstructure of the resulting coating as a function of layer thickness of the first coating, 7 μm of $Co_3O_4$ (FIG. 2a) and 15 μm $Co_3O_4$ (FIG. 2b), after 1000 hr at 900° C. The 15 μm thick $Co_3O_4$-coating has not reacted fully with the steel.

TABLE 1

| 1st coat, thickness | 2nd coat, thickness | 500 h | 1000 h | 2000 h | 4000 h |
|---|---|---|---|---|---|
| LSM, 15 μm | | $Cr_{1.4}Mn_{1.6}O_4$ | $Cr_{1.5}Mn_{1.5}O_4$ | $Cr_{1.6}Mn_{1.4}O_4$ | $Cr_{1.6}Mn_{1.4}O_4$ |
| $Co_3O_4$, 7 μm | LSM, 15 μm | $Cr_{0.7}Mn_{1.4}Co_{0.8}Fe_{0.1}O_4$ | $Cr_{0.7}Mn_{1.6}Co_{0.6}Fe_{0.1}O_4$ | $Cr_{0.9}Mn_{1.5}Co_{0.5}Fe_{0.1}O_4$ | $Cr_{1.3}Mn_{1.2}Co_{0.5}O_4$ |
| $Co_3O_4$ 15 μm | LSM, 15 μm | $Cr_{0.3}Mn_{0.9}Co_{1.7}Fe_{0.1}O_4$ | $Cr_{0.4}Mn_{0.9}Co_{1.6}Fe_{0.1}O_4$ | $Cr_{0.5}Mn_{1.1}Co_{1.4}O_4$ | $Cr_{0.7}Mn_{0.8}Co_{1.5}O_4$ |

A trade-off between the barrier function against chromium and the desired microstructure for lowering the electrical resistance is preferably achieved through addition of more metal oxide in the second layer of multilayer structure while keeping the layer thickness of the first layer at a minimum.

Preferably, the metal oxide of the second metal oxide layer of the multilayer barrier structure is the same as the metal oxide of the first metal oxide layer. Also preferred is that said second metal oxide layer comprises a mixture of a metal oxide having at least two different metal cations and a transition metal oxide. Suitable metal oxides for the second oxide layer include oxides selected from the group consisting of alkaline earth metal oxides, preferably magnesium oxide, barium oxide, strontium oxide, calcium oxide, and transition metal oxides, preferably cobalt oxide, manganese oxide, copper oxide, lanthanum oxide, and mixtures thereof.

Furthermore, said metal oxide of the second oxide layer having at least two different metal cations preferably has a perovskite structure and is selected from the group consisting of doped lanthanum manganite, doped lanthanum cobaltite, doped lanthanum ferrite, and mixtures thereof.

The second metal oxide coating may be applied by any suitable method known to the skilled person. Preferred is spray painting of the layer or lamination with a tape cast film.

The thickness of the second metal oxide layer is preferably in a range of from about 10 to about 30 μm, more preferably of from about 15 to about 25 μm.

The second layer of the multilayer barrier structure aids in the barrier layer formation, and chromium getter materials which are able to catch chromium-rich vapor species that evaporate and migrate from the metal scale during the first period of initialisation before the first barrier layer has been fully formed, and later if a small amount of chromium vapor continuously migrates from the scale. As pointed out above, a single layer is not capable to minimize the chromium poisoning to a technologically acceptable level.

In another preferred embodiment, the method further comprises the step of forming a third metal oxide layer on top of said second metal oxide layer. In case a third metal oxide layer is applied, the metal oxide for said third layer is selected from the group consisting of doped lanthanum nickelate, doped lanthanum manganite, doped lanthanum cobaltite, doped lanthanum ferrite, doped ceria, and mixtures thereof.

The third metal oxide coating may be applied by any suitable method known to the skilled person. Preferred is however spray painting or laminating with tape cast film.

The thickness of the third metal oxide layer is preferably in a range of from about 10 to about 35 μm, more preferably of from about 20 to about 30 μm.

The third layer may also function as a current collector layer directly in contact with the air electrode. In this case, a maximum in-plane conductivity to distribute the conductivity as evenly as possible is achieved for the third layer.

After applying the respective metal oxide layers on the metal interconnect, the manufacture of the stack is completed. More specifically, contact layers are applied on both sides of the solid oxide cell, and the cells and interconnects are assembled in an alternating sequence with interlaying sealing components.

Figure 3:
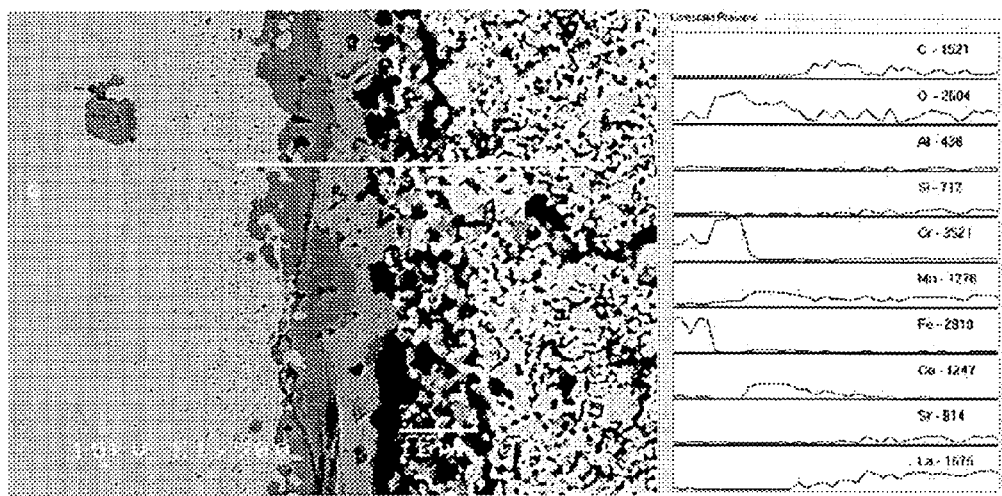
FIG. 3 is a micrograph showing a cross section of a barrier structure in accordance with the present invention.

FIG. 3 illustrates an example of a final multilayer barrier structure. Additionally, the result of a so-called line-scan is shown, where the EDS-response from a selected range of chemical elements is recorded along a pre-defined path of the incoming electron beam, which has been indicated by the solid white line on the micrograph. The metal phase, light gray at the left, is covered by a 4-6 μm thick chromia layer, darker gray, and a 6-10 μm thick layer of a formed Mn—Co-spinel layer with only a low chromia concentration, cf. the Cr-profile of the line-scan. The layers have been formed in air at 950° C. after applying a 10 μm thick first layer of cobalt oxide, and reacting said cobalt oxide with manganese diffusing outward from the steel forming the interconnect. The formed microstructure is dense and adheres well to the protective scale formed between the steel surface and the Mn—Co-spinel layer. The second, porous 24 μm thick second coating is composed of LSM.

The initialisation step of the obtained stack is carried out at an elevated temperature, preferably at a temperature of at least about 500° C., more preferably between about 700° C. and about 1100° C. Furthermore, the initialisation step is carried out under controlled conditions for atmosphere and current load within actual ranges depending on both the temperature and on the coating material. For example, if the initialisation temperature is about 950° C. and the first coating layer is preferably primarily from cobalt oxide, air from the atmosphere may be used directly in combination with a current load of 0.02-0.1 A/cm$^2$ fuel cell area, reversed with respect to the direction in a fuel cell. If the initialisation temperature is about 850° C. and the first coating layer is preferably primarily from cobalt oxide, the oxygen partial pressure is kept below approximately 0.06 bar and combined with said current load.

During the initialisation, a reaction between the metal interconnect and the applied first metal oxide layer takes place. Preferably, the reaction product of the reaction between the metal oxide of said first metal oxide layer and the metal of the metal interconnect is electrically conductive and dense, more preferably having a spinel structure.

During the operation of a cell stack, a chromia-rich layer will be formed directly on the metal surface due to the reaction of the metal with oxygen. However, in the multilayer barrier structure of the present invention, the reaction product of the metal oxide of the first metal oxide with metal components of the interconnect forms a chromia-free or a chromia-lean layer, preferably a chromia-free spinel layer, on top thereof. The layer formed by the reaction of the metal oxide of the first metal oxide with the interconnect thus forms a barrier layer effectively suppressing the transport of chromium from the metal through the layer.

The second metal oxide layer functions as a barrier material for chromium containing species evaporating and migrating during the initialization of the cell before the formation of the layer formed by the reaction of the metal oxide of the first metal oxide with the interconnect is completed. Thus, the electrode is effectively protected against chromium poisoning even during the initialization of the cell. Furthermore, in case chromium containing species diffuse through the first layer during operation of the cell at any point of the lifetime of the cell, the second metal oxide layer functions as an additional chromium getter and thus effectively protects the electrode layer from chromium poisoning.

In a preferred embodiment, a third metal oxide layer is applied on top of the second metal oxide layer. The third metal oxide layer maximizes the electrical in-plane contacts of the barrier layer and contact to the electrode layer as well as minimises the surface diffusion of chromium from the said second metal oxide layer to the active air electrode. As a result, the in-plane conductivity is enhanced, chromium poisoning can be suppressed, and the life time of the cell can be improved.

The present invention furthermore provides a multilayer barrier structure, obtainable by the above described method. The multilayer barrier structure is suitable to be used in producing a multilayer barrier structure in a solid oxide fuel cell (SOFC) or a solid oxide electrolysis cell (SOEC) stack.

Advantageously, with the barrier layer of the present invention, chromium poisoning of the electrode layers is effectively suppressed, increasing the lifetime of the cell. At the same time, the barrier layer of the present invention attains low interface resistance so as not to interfere with the overall cell efficiency.

The method of the present invention is a simple method for obtaining said barrier layer, and therefore more cost effective than the methods proposed in the prior art, employing complicated and expensive production steps, such as plasma spray and the like.

Moreover, the barrier layer is effectively formed during the initialization of the stack, and thus no separate pre-treatment of the interconnect prior to the build-in into a cell stack is necessary, thereby simplifying the manufacture of the cell.

Finally, since cheap materials can be employed, the components for the barrier layer do not add significantly to the overall costs of the cells, in return enabling the mass production of the cells having a barrier layer against chromium poisoning.

The invention will in the following be illustrated with reference to the detailed examples which are however not limiting the invention.

Examples

Preparation of the Metal Interconnects

Interconnect materials of a ferritic chromium steel were cut to shape before being treated with the surface coatings. Surface oxides on the interconnect metal inherent from the steel production were removed prior to coating by uniformly sanding the specimens with grit 1000 SiC-paper followed by dusting off surfaces with pressurised air and rinsing in first acetone and then in ethanol, both using an ultrasonic bath.

Application of the Metal Oxide Coatings

The coatings were applied at room temperature by spraying slurry mixtures from about 6-14 vol % of granular powers dispersed in an organic vehicle encompassing solvent, dispersant and binder, which were then dried at about 50-60° C. in an air stream.

Perovskite powders, lanthanum-strontium-manganite ($La_{0.85}Sr_{0.15}MnO_3$), henceforth referred to as LSM, lanthanum-strontium-cobaltite ($La_{0.84}Sr_{0.16}CoO_3$), henceforth referred to as LSC and ($La_{0.3}Sr_{0.7}CoO_3$), henceforth referred to as LSC', strontium-cobaltite ($SrCoO_{2.5}$), henceforth referred to as SC, Lanthanum-ferro-nickelate ($LaNi_{0.59}Fe_{0.41}O_{3-d}$) henceforth referred to as LNF and lanthanum-strontium-ferri-cobaltite ($La_{0.6}Sr_{0.4}Fe_{0.8}Co_{0.2}O_3$), henceforth referred to as SLFC, were produced by the Glycinenitrate route from nitrate solutions [L. A. Chick, L. R. Pederson, G. D. Maupin, J. L. Bates, L. E. Thomas and G. J. Exarhos, Materials Letters, 10, (1990), p. 6-12], calcined and milled to desired grain size distribution (0.8 µm<d50<5 µm) by ball milling.

Single-oxide powders ($Co_3O_4$, $Mn_3O_4$, CuO) were obtained as analytical grade materials from commercial sources and milled to desired grain size distribution (0.6 µm<$d_{50}$<2.5 µm) by ball milling. Grain size distributions were measured by a Beckman coulter I/S particle size analyser.

Stack Formation

The coated metal interconnects were stacked alternating with fuel cells, and supplied with glass-based sealing components in between each layer in a SOFC-stack, based on a planar cell design.

During initialisation, air was supplied to both, anode- and cathode compartments at flow rates of 5-6 ml/min cm² surface area until termination of the binder burn-out sequence at 500-650° C., after which the atmosphere composition differed between the two compartments, as exemplified by the combined anode reduction and cathode coating reaction sequence, e.g. at 950° C. for 2.5 hours, where dry hydrogen was fed to the anode compartment and air was fed to the to the cathode compartment, while passing a current load of 0.02-0.1 A/cm² fuel cell area through the stack, reversed with respect to the direction in an operating fuel cell.

Evaluation of the Cells

After initialization, stacks were heated up to operating temperatures between about 650° C. and about 850° C., where degradation was measured under constant conditions for specific current load and temperatures for periods between 200 hours and 1500 hours.

Chromium poisoning of the air electrode, when active, caused significant reduction of the maximum power density within a few hundreds of hours from initialisation, which was observed when using un-coated metal interconnects as a reference. The degradation was assessed by impedance spectroscopy and change in normalised voltage or area specific resistance over time. Comparison was made to both un-coated metal parts, stack degradation e.g. at 750° C. reached the range of 10-30% per 1000 hours, and to metal parts coated with a dense, gas-tight oxide coating prepared by plasma spraying metal oxide powders on the steel, where stack degradation were recorded similarly in the range of 0.2-0.5% per 1000 hours, which is also close to the detection limit established through testing single cells similarly but in a chromium-free environment. For the multi-layer coated metal parts in accordance with the present invention, stack degradation was measured similarly in the range from 0.2-3% per 1000 hours, cf. FIG. 4.

Figure 4:
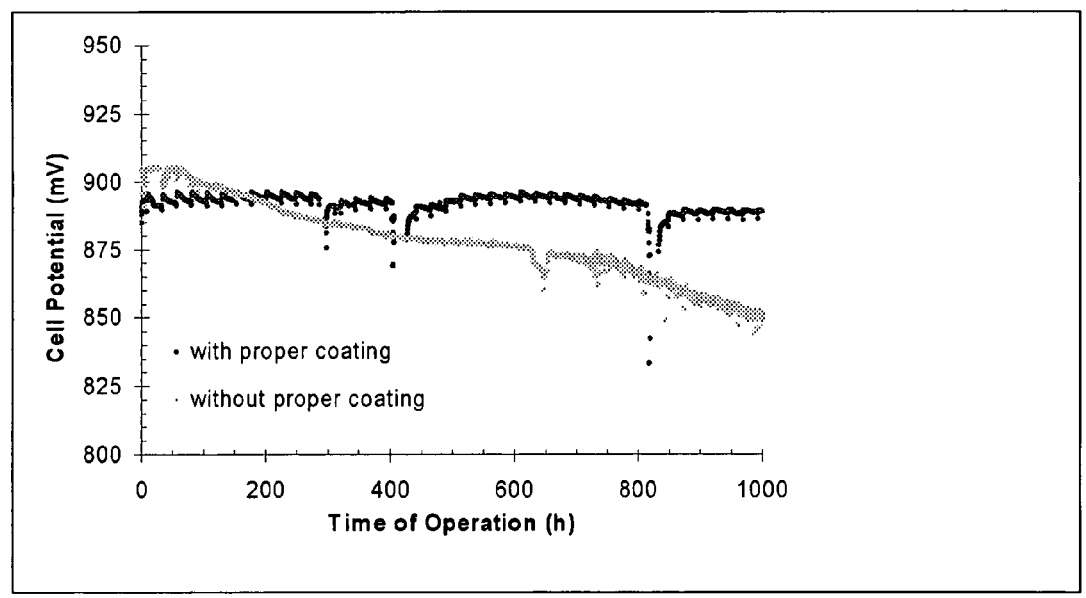
FIG. 4 illustrates the difference in electrical performance of degradation rate of a stack element from similar components with and without the protective coating on the air electrode face of the interconnect.

FIG. 4: Experimental validation of interconnect coating of example 1 through stack test at 750° C. for 1000 hr.

Example 1

Crofer 22APU was cleaned and slurry-coated with a 7 µm thick layer of cobalt oxide ($d_{50}$=2.5 µm), dried and further slurry-coated with a 20 µm thick layer of 90 wt % LSM and 10 wt % cobalt oxide. With the coated part facing the cathode of a solid oxide fuel cell (SOFC) and incorporated into a SOFC-stack, the metal part was heated in flowing air (5.4 ml/min/cm² surface area) by 3° C. per minute to 650° C. and held at the temperature for 2 hours to burn out any residual organic binder before heating under the same conditions to 950° C., where it was held for 3 hours in order to form the spinel barrier layer on the metal surface in the cathode compartment. The SOFC-stack was then cooled to operating temperature (750° C.) and connected to an electrical load, where the degradation rate, 0.2% per 1000 hours, was assessed at a current load of 0.25 A/cm² cell area.

Example 2

Sandvik 0YC44 was cleaned and slurry-coated with a 7 µm thick layer of cobalt oxide and copper oxide (2:1 wt/wt), dried and further slurry-coated with a 20 µm thick layer of 60 wt % LSM 30 wt % LSFC and 10 wt % cobalt oxide. With the coated part facing the cathode of a solid oxide fuel cell and incorporated into a SOFC-stack the metal part was heated in flowing air (5.4 ml/min/cm² surface area) by 3° C. per minute to 550° C. and held at the temperature for 2 hours to burn out any residual organic binder before heating in a flowing mixture of air and nitrogen (1:50 vol:vol) at 3° C. per minute to 950° C., where it was held for 4.5 hours in order to form the spinel barrier layer on the metal surface in the cathode compartment. The SOFC-stack was then cooled to operating temperature (750° C.) and connected to an electrical load, while feeding air to the cathode compartment.

Example 3

ZMG232 was cleaned and slurry-coated with a 5 µm thick layer of copper oxide and manganese oxide (4:1 mol/mol), dried and further slurry-coated with a 25 µm thick layer of 50 wt % LSM 30 wt % LSC and 20 wt % cobalt oxide. With the coated part facing the cathode of a solid oxide fuel cell and incorporated into a SOFC-stack, the metal part was heated in flowing air by 3° C. per minute to 550° C. and held at the temperature for 2 hours to burn out any residual organic binder before heating in a flowing mixture of air and nitrogen (1:9 vol:vol) at 5° C. per minute to 950° C., where it was held for 4 hours in order to form the spinel barrier layer on the metal surface in the cathode compartment. The SOFC-stack was then cooled to operating temperature (850° C.) and connected to an electrical load.

Example 4

Crofer 22APU was cleaned and slurry-coated with a 7 µm thick layer of cobalt oxide ($d_{50}$=0.6 µm), dried and further slurry-coated with a 20 µm thick layer of 90 wt % LSM and 10 wt % cobalt oxide. With the coated part facing the cathode of a solid oxide fuel cell and incorporated into a SOFC-stack the metal part was heated in flowing air by 3° C. per minute to 550° C. and held at the temperature for 2 hours to burn out residual organic binder before heating in a flowing mixture of air and nitrogen (1:30 vol:vol) at 3° C. per minute to 750° C., where it was held for 15 hours in order to form the spinel barrier layer on the metal surface in the cathode compartment. During the latter sequence a current (0.05 A/cm²) was passed through the SOFC-stack from the anode to the cathode terminals. The SOFC-stack was then cooled to operating temperature (650° C.) and connected to an electrical load, while feeding air to the cathode compartment.

Example 5

Sandviken 0YC44 was cleaned and slurry-coated with a 10 µm thick layer of cobalt oxide ($d_{50}$=2.5 µm), dried and further slurry-coated with a 30 μm thick layer of 85 wt % LSM and 15 wt % cobalt oxide. With the coated part facing the cathode of a solid oxide fuel cell and incorporated into a SOFC-stack, the metal part was heated in flowing air by 3° C. per minute to 550° C. and held at the temperature for 2 hours to burn out residual organic binder before heating under the same conditions to 1050° C., where it was held for 2.5 hours in order to form the spinel barrier layer on the metal surface in the cathode compartment. The SOFC-stack was then cooled to operating temperature (850° C.) and connected to an electrical load.

Example 6

A metal part (ZMG232) was cleaned and slurry-coated with a 10 μm thick layer of cobalt oxide and manganese oxide (4:1 mol/mol), dried and further slurry-coated with a 25 μm thick layer of 55 wt % LSC 25 wt % LSC' and 20 wt % SC. With the coated part facing the cathode of a solid oxide fuel cell and incorporated into a SOFC-stack the metal part was heated in flowing air at 3° C. per minute to 550° C. and held at the temperature for 2 hours to burn out residual organic binder before heating in a flowing mixture of air and nitrogen (1:100 vol:vol) at similar rate to 850° C., where it was held for 5 hours in order to form the spinel barrier layer on the metal surface in the cathode compartment. During the latter sequence an alternating current (1 kHz, 0.05 A/cm$^2$) was passed through the SOFC-stack between the anode to the cathode poles. The SOFC-stack was then cooled to operating temperature (750° C.) and connected to an electrical load.

Example 7

Crofer 22APU was cleaned and slurry-coated with a 5 μm thick layer of cobalt oxide ($d_{50}$=0.6 μm), dried and further slurry-coated with a 25 μm thick layer of 75 wt % LSM, 10 wt % barium oxide, 10 wt % calcium carbonate and 5 wt % magnesium oxide. With the coated part facing the cathode of a solid oxide fuel cell and incorporated into a SOFC-stack, the metal part was heated in flowing air (5.4 ml/min/cm$^2$ surface area) by 3° C. per minute to 550° C. and held at the temperature for 2 hours to burn out residual organic binder before heating under similar conditions to 900° C., where it was held for 3.5 hours in order to form the spinel barrier layer on the metal surface in the cathode compartment. The SOFC-stack was then cooled to operating temperature (750° C.) and connected to an electrical load.

Example 8

Sandvik 1C44Mo20 was cleaned and slurry-coated with a 10 μm thick layer of cobalt oxide and cupper oxide (2:1 wt/wt), dried and further slurry-coated with a 35 μm thick layer of 90 wt % LSM and 10 wt % cobalt oxide. With the coated part facing the cathode of a solid oxide fuel cell and incorporated into a SOFC-stack the metal part was heated in flowing air by 3° C. per minute to 550° C. and held at the temperature for 2 hours to burn out any residual organic binder before heating in flowing air at 3° C. per minute to 950° C., where it was held for 4.5 hours in order to form the spinel barrier layer on the metal surface in the cathode compartment. The SOFC-stack was then cooled to operating temperature (750° C.) and connected to an electrical load, while feeding air to the cathode compartment.

Example 9

ZMG232 was cleaned and slurry-coated with a 10 μm thick layer of copper oxide, manganese oxide and LSM (16:4:1 mol/mol), dried and further slurry-coated with a 25 μm thick layer of copper oxide, manganese oxide and LSM (4:1:8 mol/mol). With the coated part facing the cathode of a solid oxide fuel cell and incorporated into a SOFC-stack, the metal part was heated in flowing air by 3° C. per minute to 550° C. and held at the temperature for 2 hours to burn out any residual organic binder before heating in a flowing mixture of air and nitrogen (1:9 vol:vol) at 5° C. per minute to 950° C., where it was held for 4 hours in order to form the spinel barrier layer on the metal surface in the cathode compartment. The SOFC-stack was then cooled to operating temperature (850° C.) and connected to an electrical load.

Example 10

Crofer 22APU was cleaned and slurry-coated with a 7 μm thick layer of cobalt oxide ($d_{50}$=2.5 μm), dried and further slurry-coated with a 20 μm thick mixed layer of LSM and LSC (1:1 w:w). After drying, a third 25 μm thick layer of LNF was applied by slurry-casting and the coated component further dried. With the coated part facing the cathode of a solid oxide fuel cell (SOFC) and incorporated into a SOFC-stack, the metal part was heated in flowing air (5.4 ml/min/cm$^2$ surface area) by 3° C. per minute to 550° C. and held at the temperature for 2 hours to burn out any residual organic binder before heating under the same conditions to 950° C., where it was held for 3 hours in order to form the spinel barrier layer on the metal surface in the cathode compartment. The SOFC-stack was then cooled to operating temperature (750° C.) and connected to an electrical load, where the degradation rate was assessed at a current load of 0.25 A/cm$^2$ cell area.

The invention claimed is:

1. A method of producing a multilayer barrier structure in a solid oxide cell stack, comprising the steps of:
   providing a metal interconnect;
   applying a first metal oxide layer on said metal interconnect, wherein said first metal oxide layer comprises cobalt oxide;
   applying a second metal oxide layer on top of said first metal oxide layer;
   applying a third metal oxide layer on top of said second metal oxide layer;
   forming a solid oxide cell stack comprising said metal interconnect having said metal oxide layers thereon; and
   initializing the solid oxide cell stack by reacting the metal oxide in said first metal oxide layer with the metal of said metal interconnect at an elevated temperature above 950° C.

2. The method of claim 1, wherein the initialization step is carried out under controlled conditions for atmosphere composition and current load, which depends on the layer composition and facilitates the formation of the desired reaction products as a dense barrier layer without chromium species migrating to the air-electrode.

3. The method of claim 1, wherein the reaction product of the reaction between the metal oxide of said first metal oxide layer and the metal of said metal interconnect is electrically conductive and dense.

4. The method of claim 1, wherein the metal oxide of said first metal oxide layer and the metal oxide of said second metal oxide layer is the same.

5. The method of claim 1, wherein said second metal oxide layer comprises a mixture of a metal oxide having at least two different metal cations and a metal oxide.

6. The method of claim 5, wherein the metal oxide of said mixture is selected from the group consisting of alkaline earth metal oxides and transition metal oxides, and mixtures thereof.

7. The method of claim 5, wherein the metal oxide having at least two different metal cations of said mixture has a perovskite structure and is selected from the group consisting of doped lanthanum manganite, doped lanthanum cobaltite, doped lanthanum ferrite, and mixtures thereof.

8. The method of claim 1, wherein the thickness of said first metal oxide layer is from about 1 to about 20 µm.

9. The method of claim 1, wherein the thickness of said second metal oxide layer is from about 10 to about 30 µm.

10. The method of claim 1, further comprising the step of forming a third metal oxide layer on top of said second metal oxide layer, wherein the metal oxide for said third layer is selected from the group consisting of doped lanthanum nickelate, nickel oxide, lanthanum manganite, doped lanthanum cobaltite, doped lanthanum ferrite, doped ceria, and mixtures thereof.

11. A multilayer barrier structure made by the method of claim 1.

12. A solid oxide cell stack comprising an anode contact layer and support structure, an anode layer, an electrolyte layer, a cathode layer, a cathode contact layer, a metallic interconnect, and the multilayer barrier structure of claim 11.

13. The solid oxide cell stack of claim 12, wherein the multilayer barrier structure is located between the electrode layer and the metallic interconnect.

14. Use of the multilayer barrier structure of claim 11 as a barrier layer structure in solid oxide fuel cells or solid oxide electrolysis cells.

15. A method for controlling the heating sequence and the gas phase composition during the initialization of the solid oxide cell stack of claim 12 so as to transform the barrier layer into an electrically conductive and dense reaction product.

16. The method of claim 3, wherein the reaction product of the reaction between the metal oxide of said first metal oxide layer and the metal of said metal interconnect has a spinel structure.

17. The method of claim 6, wherein the metal oxide of said mixture is selected from the group consisting of magnesium oxide, barium oxide, strontium oxide, calcium oxide, cobalt oxide, manganese oxide, copper oxide, lanthanum oxide, and mixtures thereof.

* * * * *